United States Patent [19]

Darnell et al.

[11] Patent Number: 5,155,203

[45] Date of Patent: Oct. 13, 1992

[54] POLY (ETHER-KETONE)

[75] Inventors: W. Ronald Darnell, Weber City, Va.; Winston J. Jackson, Jr., Kingsport, Tenn.

[73] Assignee: Eastman Kodak Company, Rochester, N.Y.

[21] Appl. No.: 413,154

[22] Filed: Sep. 27, 1989

[51] Int. Cl.$^5$ .................. C08G 8/08; C08G 14/00; C08G 63/18; C08G 63/16
[52] U.S. Cl. .................. 528/125; 528/126; 528/128; 528/219; 528/220; 528/223; 528/271; 528/272; 528/286; 528/296; 528/302; 528/308; 528/360; 528/361; 528/364
[58] Field of Search ............... 528/125, 126, 128, 219, 528/220, 360, 302, 308, 223, 271, 272, 286, 296, 361, 364

[56] References Cited

U.S. PATENT DOCUMENTS 3,637,592  1/1972  Berr ..................... 528/194
4,720,537  1/1988  Brugel .................. 528/125
4,816,556  3/1989  Gay et al. .............. 528/176
4,839,459  6/1989  Darnell et al. .......... 528/220

FOREIGN PATENT DOCUMENTS 192260  8/1986  European Pat. Off. .

OTHER PUBLICATIONS

Makromol. Chem., Rapid Commun. 5, 833-836 (1985). Mitsuru Ueda et al., "Synthenis of Polyketones by direct Polycondensation of dicarboxylic acids with diaryl compounds using phozphorus pentoxide ainethane sulfonic acid as condensing agent and solvent".
Mitsuru Ueda and Masaki Sate, Synthesis of Aromatic Poly(ether ketones) *Macromolecules*, 1987, 20, 2675-2678.

*Primary Examiner*—John Kight, III
*Assistant Examiner*—P. Hampton-Hightower
*Attorney, Agent, or Firm*—Bernard J. Graves, Jr.; J. Frederick Thomsen; William P. Heath, Jr.

[57] ABSTRACT

Disclosed is a poly(ether-ketone) having an inherent viscosity of at least 0.4 and consisting of the repeating unit

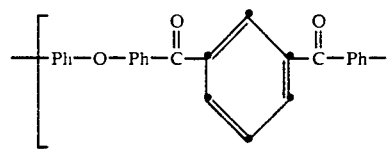

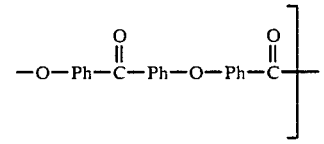

wherein each Ph is 1,4-phenylene. The poly(ether-ketone) is derived from two specific reactants, 1,3-bis-(4-phenoxybenzoyl)benzene and 4,4'-oxydibenzoic acid which may be reacted in the presence of methanesulfonic acid and phosphorus pentoxide.

9 Claims, No Drawings

POLY-(ETHER-KETONE)

This invention pertains to a high-molecular weight poly(ether-ketone) which can be prepared using convenient and economical manufacturing procedures. More specifically, this invention pertains to a novel poly(ether-ketone) having an inherent viscosity of at least 0.4 and derived essentially from two specific monomers: 1,3-bis(4-phenoxybenzoyl)benzene and 4,4'-oxydibenzoic acid.

The use of methanesulfonic acid in combination with phosphorus pentoxide to prepare poly(ether-ketone) polymers is economically advantageous when compared to other known procedures such as those requiring the use of halogenated sulfonic acids such as trifluoromethane-sulfonic acid. The use of such a reaction medium in the preparation of poly(ether-ketone) polymers is disclosed by Ueda et al. in Macromolecules, 1987, 20, 2675-2678 and Makrol. Chem., Rapid Comm. 5, 833-836 (1985). These references do not disclose the preparation of poly(ether-ketone) polymers from 1,3-bis(4-phenoxy-benzoyl)benzene and 4,4'-oxydibenzoic acid. In fact, Ueda et al. teach that the use of typical dicarboxylic acids such as isophthalic and terephthalic acids cannot be used in the described process or that their use gives poor results. One of the essential monomers from which the polymer of our invention is derived, 1,3-bis(4-phenoxybenzoyl)benzene, is prepared from isophthalic acid and diphenyl ether.

The preparation of poly(ether-ketone) polymers from 1,3-bis(4-phenoxybenzoyl)benzene is disclosed in European Patent 192,260 (Example 5) but this patent does not disclose the preparation of a poly(ether-ketone) from the specific combination of 1,3-bis(4-phenoxy-benzoyl)benzene and 4,4'-oxydibenzoic acid. Furthermore, this patent neither discloses nor contemplates the preparation of poly(ether-ketone) polymers using the methanesulfonic acid/phosphorus pentoxide system referred to above. U.S. Pat. No. 4,720,537 teaches that high-molecular weight poly(ether-ketone) polymers may be prepared from 1,3-bis(4-phenoxy-benzoyl)benzene but does not disclose the polymerization of that monomer with 4,4'-oxydibenzoic acid nor does that patent contemplate the manufacture of poly(ether-ketone) polymers by the economically advantageous procedure using methanesulfonic acid and phosphorus pentoxide.

The novel poly(ether-ketone) polymer provided by this invention consists of repeating units having the formula

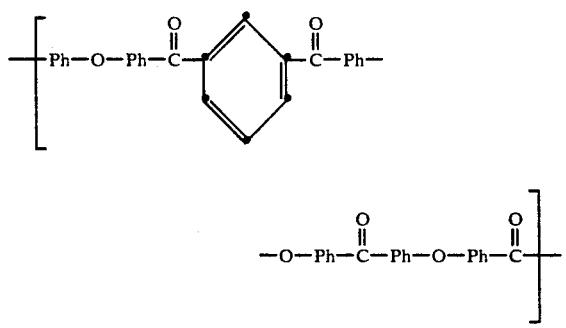

wherein each Ph is 1,4-phenylene and is derived from 1,3-bis(4-phenoxybenzoyl)benzene and 4,4'-oxydibenzoic acid. Preferably, the polymer having the above repeating unit is prepared by the novel reaction of 1,3-bis(4-phenoxybenzoyl)benzene and 4,4'-oxydibenzoic acid in the presence of methanesulfonic acid and phosphorus pentoxide according to known procedures. Both the poly(ether-ketone) polymer and its preparation in the presence of methanesulfonic acid and phosphorus pentoxide are unique in that the same high-molecular weight polymer cannot be obtained by the same procedure from reactants analogous to those described herein. For example, when isophthalic acid/diphenyl ether/4,4'-oxydibenzoic acid are reacted in a molar ratio of 0.5/1.0/0.5 in methanesulfonic acid and phosphorus pentoxide, a relatively low molecular weight polymer is obtained rather than a high molecular weight polymer similar to that provided by this invention.

The poly(ether-ketone) polymer of our invention preferably has an inherent viscosity of at least 0.5, especially in the range of about 0.6 to 0.8. The polymer exhibits an excellent combination of properties, particularly good solvent and chemical resistance and excellent hydrolytic stability, and may be melt processed by conventional extrusion and molding techniques in the manufacture of a wide variety of products.

The process of our invention comprises the polymerization or polyacylation reaction of the aforesaid reactants in the presence of methanesulfonic acid and phosphorus pentoxide. The methanesulfonic acid serves as both a catalyst and a solvent for the reaction. Thus, the minimum amount required is the amount of methanesulfonic acid required to solvate the reactants and the polymeric product while maintaining a satisfactory degree of stirrability. The maximum amount which may be used is limited only by practical considerations such as reactor size, cost of recovering the methanesulfonic acid, etc. Typically, the weight ratio of methanesulfonic acid to the weight of the poly(ether-ketone) product is in the range of about 4:1 to 6:1.

The amount of phosphorus pentoxide used normally is at least one gram-equivalent (⅕ mole) per mole of water formed during the polyacylation reaction, i.e., ⅖ mole phosphorus pentoxide per mole of 4,4'-oxydibenzoic acid reactant. However, to ensure formation of a high molecular weight product, an excess, e.g., from about 2.0 to 4.0 moles phosphorus pentoxide per mole of 4,4'-oxydibenzoic acid, typically is used. The 1,3-bis(4-phenoxybenzoyl)benzene and 4,4'-oxydibenzoic acid reactants are normally used in approximately equimolar amounts although a slight excess, e.g., up to 2 to 3 mole percent excess, of either may be employed.

Our novel process may be carried out at temperatures ranging from about ambient temperature to 120° C., preferably at temperatures in the range of about 60° to 100° C. The process may be carried out at pressures moderately above or below ambient pressure although the reaction normally is performed at ambient pressure. In addition to the essential 1,3-bis(4-phenoxybenzoyl)-benzene and 4,4'-oxydibenzoic acid reactants, a capping agent such as biphenyl, benzoic acid, 3,5-dichlorobenzoic acid and the like may be included in the process. Such a capping agent may be added at the commencement of or during the process or it may be added as a second stage of the polymer manufacturing process. The optional capping agent may be used in an amount equal to about 2 to 3 mole percent based on either the moles of 1,3-bis(4-phenoxybenzoyl)-benzene or 4,4'-oxydibenzoic acid used.

The process and poly(ether-ketone) of our invention are further illustrated by the following examples. The inherent viscosities (I.V.) referred to herein are determined at 25° C. using 0.25 g polymer per 100 mL of 98% sulfuric acid. Films of the polymer are prepared by compression molding using a Hannafin press at 375° C. for 30 seconds. Film toughness is assessed by hand-creasing the pressed film. Glass transition temperatures (Tg) and melting temperatures (Tm) are determined by differential scanning calorimetry (DSC) using a Perkin Elmer Differential Scanning Calorimeter, Model DSC-2, at a scan rate of 20° C. per minute.

EXAMPLE 1

A 300 mL, three-necked flask equipped with a glass stirrer with a Teflon blade is dried for 25 minutes in a forced-air oven at 125° C. and then is further equipped with a nitrogen inlet, a thermometer, an outlet for the system, an electric stirring motor and a heating mantle. After the flask is filled with nitrogen, distilled methanesulfonic acid (145 mL) is added and the flask is heated to 80° C. Phosphorus pentoxide (34.08 g, 0.72 equivalents) is then added causing an exotherm to 90° C. After 1.5 hours, the phosphorus pentoxide is completely dissolved to give a medium amber solution which then is cooled to 60° C. 4,4'-Oxydibenzoic acid (15.48 g, 0.06 mole) is added to the flask, the mixture is stirred for 85 minutes and then 1,3-bis(4-phenoxybenzoyl)benzene (28.48 g, 0.0606 mole—a 1 mole percent excess assuming 100% purity) is added. Stirring at 60° C. is continued for 40 hours and then the dark amber, moderately viscous polymerization mixture is precipitated in water in a Waring Blendor. The poly(ether-ketone) product is washed three times with water, extracted with boiling water for 1 hour, extracted with refluxing acetone overnight and then dried overnight in a vacuum oven at 120° C. The cream-tan, fibrous polymer has an inherent viscosity of 0.55, a glass transition temperature of 155° C. and a melting temperature of 301° C. The poly(ether-ketone) thus obtained forms a medium-amber, tough film.

EXAMPLE 2

The procedure described in Example 1 is repeated on a smaller scale using a 100 mL, three-necked flask and the following amounts of materials:
25.00 mL distilled methanesulfonic acid
2 03 g (0.044 equivalents) phosphorus pentoxide
2.06 g (0.008 mole) 4,4'-oxydibenzoic acid
3.76 g (0.008 mole) 1,3-bis(4-phenoxybenzoyl)-benzene
The polymerization is completed by stirring for 75 hours at 60° C. The poly(ether-ketone) polymer thus obtained has an inherent viscosity of 0.75 and gives a tough film when compression molded at 375° C.

COMPARATIVE EXAMPLE 1

The procedure described in Example 2 is repeated using the following amounts of materials:
36 00 mL distilled methanesulfonic acid
3.03 g (0.064 equivalents) phosphorus pentoxide
2.06 g (0.008 mole) 4,4'-oxydibenzoic acid
3.76 g (0.008 mole) 1,4-bis(4-phenoxybenzoyl)-benzene
The polymerization is carried out at 60° C. for 21 hours and then at 70° C. for 78 hours. The cream-tan polymer obtained has as inherent viscosity of only 0.20 and gives a very brittle film upon compression molding. The low inherent viscosity is attributable to the insufficient solubility and precipitation of the poly-(ether-ketone) during its preparation.

COMPARATIVE EXAMPLE 2

The procedure described in Example 2 is repeated using the following amounts of materials:
27.00 mL distilled methanesulfonic acid
3 79 g (0.08 equivalents) phosphorus pentoxide
1.66 g (0.01 mole) terephthalic acid
4.79 g (0.0102 mole) 1,3-bis(4-phenoxybenzoyl)-benzene
The polymerization is carried out at 60° C. for 74 hours to obtain a very low viscosity, dark-amber reaction mixture. The product is isolated, purified and dried as described in Example 1 to give a poly(ether-ketone) which has an inherent viscosity of only 0.08 and gives a very discontinuous and brittle film upon compression molding. The low inherent viscosity is caused by the insufficient solubility and precipitation of the poly-(ether-ketone) during its preparation.

COMPARATIVE EXAMPLE 3

The procedure described in Example 1 is repeated on a smaller scale using a 50 mL, three-necked flask and the following amounts of materials:
25.00 mL distilled methanesulfonic acid
3.03 g (0.064 equivalents) phosphorus pentoxide
2.06 g (0.008 mole) 4,4'-oxydibenzoic acid
1.33 g (0.008 mole) isophthalic acid
2.77 g (0.0163 mole) distilled diphenyl ether
The polymerization mixture is stirred for 96 hours at 60° C. to give a low viscosity, dark-amber mixture. The product is isolated, purified and dried as described in Example 1 to give a poly(ether-ketone) which has an inherent viscosity of only 0.21 and gives a very brittle film upon compression molding. The low inherent viscosity is due to xanthydrol "dead ends" (U.S. Pat. No. 4,720,537).

The invention has been described in detail with particular reference to preferred embodiments thereof, but it will be understood that variations and modifications may be effected within the spirit and scope of the invention.

We claim:

1. A poly(ether-ketone) derived from 1,3bis-(4-phenoxybenzoyl)benzene and 4,4'-oxydibenzoic acid having an inherent viscosity of at least 0.4, determined at 25° C. using 0.25 g polymer per 100 mL of 98% sulfuric acid, and consisting of repeating units having the formula

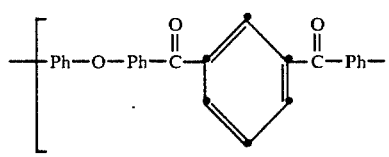

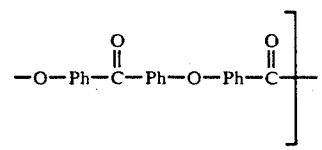

wherein each Ph is 1,4-Phenylene.

2. A poly(ether-ketone) according to claim 1 having an inherent viscosity of at least 0.5.

3. A poly(ether-ketone) according to claim 1 having an inherent viscosity of about 0.6 to 0.8.

4. Process for the preparation of a poly(ether-ketone) having an inherent viscosity of at least 0.4, determined at 25° C. using 0.25 g polymer per 100 mL of 98% sulfuric acid and consisting of repeating units having the formula

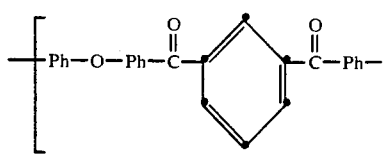

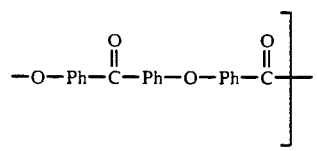

wherein each Ph is 1,4-phenylene, which comprises reacting 1,3-bis(4-phenoxybenzoyl)benzene and 4,4'-oxydibenzoic acid in the presence of methanesulfonic acid and phosphorus pentoxide wherein an excess from 2.0 to 4.0 moles of phosphorus pentoxide is used per mole of 4,4'-oxydibenzoic acid.

5. Process according to claim 4 wherein 1,3bis-(4-phenoxybenzoyl)benzene and 4,4'-oxydibenzoic acid are reacted at a temperature in the range of ambient temperature to about 120° C.

6. Process according to claim 4 wherein 1,3-bis-(4-phenoxybenzoyl)benzene and 4,4'-oxydibenzoic acid are reacted at a temperature of about 60° to 100° C. in the presence of methanesulfonic acid and phosphorus pentoxide wherein the weight ratio of methanesulfonic acid to weight of poly(ether-ketone) product is about 4:1 to 6:1 and about 2.0 to 4.0 moles of phosphorus pentoxide are used per mole of 4,4'-oxydibenzoic acid.

7. A poly(ether-ketone) having an inherent viscosity of at least 0.4, determined at 25° C. using 0.25 g polymer per 100 mL of 98% sulfuric acid, and consisting of repeating units having the formula

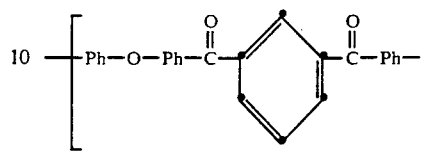

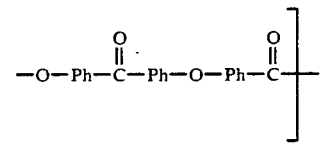

wherein each Ph is 1,4-phenylene, obtained by reacting 1,3-bis(4-phenoxybenzoyl)benzene and 4,4'-oxydibenzoic acid in the presence of methanesulfonic acid and phosphorus pentoxide wherein an excess from 2.0 to 4.0 moles of phosphorus pentoxide is used per mole of 4,4'-oxydibenzoic acid.

8. A poly(ether-ketone) according to claim 7 having an inherent viscosity of about 0.6 to 0.8.

9. A poly(ether-ketone) according to claim 7 having an inherent viscosity of about 0.6 to 0.8 obtained by reacting 1,3-bis(4-phenoxybenzoyl)benzene and 4,4'-oxydibenzoic acid at a temperature of about 60 to 100° C. in the presence of methanesulfonic acid and phosphorus pentoxide wherein the weight ratio of methanesulfonic acid to weight of poly(ether-ketone) product is about 4:1 to 6:1 and about 2.0 to 4.0 moles of phosphorus pentoxide are used per mole of 4,4'-oxydibenzoic acid.

* * * * *